(12) United States Patent
Oommen

(10) Patent No.: US 11,600,054 B2
(45) Date of Patent: Mar. 7, 2023

(54) METHODS AND SYSTEMS FOR MANUFACTURE OF A GARMENT

(71) Applicant: Anne Oommen, London (GB)

(72) Inventor: Anne Oommen, London (GB)

(73) Assignee: Anne Oommen, London (GB)

( * ) Notice: Subject to any disclaimer, the term of this patent is extended or adjusted under 35 U.S.C. 154(b) by 0 days.

(21) Appl. No.: 16/627,976

(22) PCT Filed: Jul. 4, 2018

(86) PCT No.: PCT/GB2018/051888
§ 371 (c)(1),
(2) Date: Dec. 31, 2019

(87) PCT Pub. No.: WO2019/008360
PCT Pub. Date: Jan. 10, 2019

(65) Prior Publication Data
US 2020/0134930 A1    Apr. 30, 2020

(30) Foreign Application Priority Data
Jul. 4, 2017    (GB) ..................................... 1710767

(51) Int. Cl.
*G06T 19/20*    (2011.01)
*A41H 1/00*    (2006.01)

(52) U.S. Cl.
CPC ............... *G06T 19/20* (2013.01); *A41H 1/00* (2013.01); *G06T 2210/16* (2013.01); *G06T 2219/2021* (2013.01)

(58) Field of Classification Search
None
See application file for complete search history.

(56) References Cited

U.S. PATENT DOCUMENTS 3,696,456 A * 10/1972 Dunham ............... A43D 119/00
                                                     12/146 L
5,965,809 A * 10/1999 Pechter ................ A61B 5/4312
                                                     73/149
(Continued)

FOREIGN PATENT DOCUMENTS

EP    0838167 A1    4/1998
RO    131370 A2 *  9/2016   ............. A41H 3/007
(Continued)

OTHER PUBLICATIONS

International Search Report and Written Opinion of the International Searching Authority for international PCT Application No. PCT/GB2018/051888 dated Nov. 16, 2018, 10 pages.
(Continued)

*Primary Examiner* — Steven Z Elbinger
(74) *Attorney, Agent, or Firm* — Mark H. Whittenberger; Holland & Knight LLP

(57) ABSTRACT

Methods and systems for manufacture of a garment are disclosed, in particular for generating fabrication data for manufacture of a garment, where said garment is for regulation of a body region of a wearer of the garment. Measurement data for the body region of the wearer is obtained, and the measurement data is modified to simulate a regulating effect for the garment. The modified measurement data is used to generate the fabrication data for manufacturing the garment. The measurement data may be obtained for an unregulated state of the body region of the wearer, the measurement data may be modified to simulate a regulated state of the body region of the wearer. An initial form of the garment may be manufactured using the fabrication data, and the measurement data used to obtain a three-dimensional model of the body region. The initial form of the garment may then be compared to the three-dimensional (Continued)

model; and the comparison used to modify the initial form of the garment.

24 Claims, 7 Drawing Sheets

(56) References Cited

U.S. PATENT DOCUMENTS

| | | | | |
|---|---|---|---|---|
| 2009/0222127 A1* | 9/2009 | Lind | .................... | D04B 37/02 |
| | | | | 700/132 |
| 2010/0242291 A1 | 9/2010 | Ohly et al. | | |
| 2015/0154691 A1 | 6/2015 | Curry et al. | | |
| 2017/0127732 A1 | 5/2017 | Trangmar et al. | | |
| 2017/0340023 A1* | 11/2017 | McKeen | ................ | A41C 3/128 |
| 2017/0360578 A1* | 12/2017 | Shin | ....................... | B33Y 30/00 |
| 2018/0303179 A1* | 10/2018 | Konukoglu | ............. | A61F 13/08 |
| 2020/0060356 A1* | 2/2020 | Trangmar | ................ | A41C 5/00 |

FOREIGN PATENT DOCUMENTS

| | | | | |
|---|---|---|---|---|
| WO | 2005088485 A2 | 9/2005 | | |
| WO | 2012036620 A1 | 3/2012 | | |
| WO | WO-2012036620 A1 * | 3/2012 | ............ | G06T 19/20 |
| WO | 2016022729 A1 | 2/2016 | | |
| WO | 2019008360 A1 | 1/2019 | | |

OTHER PUBLICATIONS

Communication Pursuant to Article 94(3) EPC issued in European Patent Application No. 18755222.9 dated Mar. 1, 2022.

* cited by examiner

METHODS AND SYSTEMS FOR MANUFACTURE OF A GARMENT

CROSS-REFERENCE TO RELATED APPLICATION

The subject application is a U.S. National Stage application of International Application No. PCT/GB2018/051888, filed on Jul. 4, 2018, which claims the priority of Great Britain Patent Application No. 1710767.3, filed on Jul. 4, 2017. The contents of which are herein incorporated by reference in their entirety.

FIELD OF THE INVENTION

This invention is directed to methods and systems for manufacture of garments, and in particular to methods and systems for generating fabrication data for manufacture of a garment, such as a bespoke garment, where the garment is for regulation of a body region of a wearer of the garment.

BACKGROUND OF THE INVENTION

Methods of measurement of subjects for selection or manufacture of garments for those subjects are well known. For bespoke manufacture of garments, such measurements are usually made by hand; this can be time-consuming and not sufficiently accurate. In addition, even for bespoke manufacture of garments components of the garment are often only available in a set of standard sizes or shapes. This can result in inaccurate sizing and fitting of garments, even with bespoke measurements.

However, some automated methods of measurement for selection of garments are known. For example, body scanners have been previously considered for determining approximate dimensions of body regions (or the entire body) of a subject, in order to suggest a most appropriate size of a garment for that subject. However, such scanning methods are typically not sufficiently accurate to be used for manufacture of garments, especially for bespoke garments.

Certain types of garments are especially vulnerable to disadvantages in previously considered methods and systems. For example, garments which shape, modify, control or otherwise regulate one or more body regions of the subject or wearer while being worn, can be particularly difficult to measure for, and to manufacture. For instance, inaccuracy in measurement can cause poor fitting, such as incorrect regulation or support of the body region in the finished garment. In the case of garments for support of a body region, such as a brassiere for support of the bust or breasts of the wearer, inaccurate measurement or survey of the wearer can result in the garment manufactured from that measurement causing discomfort, or rendering the garment unwearable.

Previously considered automated methods of measurement also typically do not account for subtleties of measurement, such as small differences in size and shape on either side of a body region, for example in either breast of a bust region, due either to normal variation, to changes during or post-pregnancy or to removal of breast material in a mastectomy procedure.

Furthermore, previously considered measurement methods typically do not consider the regulating effect of garments which regulate or support the body region; measurement is either made while the subject is already wearing a regulating garment, or while the subject is not wearing such a garment, but without accounting for measurement differences which may be caused once the regulating garment is worn.

Even the most accurate automated or by-hand measurement methods, even for bespoke manufacture, may still only be able to provide a finished garment which uses standard integer sizes for components of the garment.

Methods of automating certain cutting or assembly stages for garment manufacture are also known to the art. However, these are typically slow and inefficient, and require additional iterations or further fittings to compare the garment to the subject and further modify the garment. Typical automated methods are thus unsuitable in particular for complex garments such as brassieres. Moreover for such garments even if any automation is sufficiently accurate, typically standard or integer sizes for garments or components thereof are nevertheless used, causing further inefficiency and resulting again in imperfect fitting garments.

The present invention aims to address these problems and provide improvements upon the known devices and methods.

STATEMENT OF INVENTION

Aspects and embodiments of the invention are set out in the accompanying claims.

One embodiment of an aspect of the invention can provide a method of generating fabrication data for manufacture of a garment, said garment for regulation of a body region of a wearer of the garment, the method comprising: obtaining measurement data for the body region of the wearer; modifying the measurement data to simulate a regulating effect for the garment; and using the modified measurement data to generate the fabrication data for manufacturing the garment.

This allows more accurate generation of the fabrication data for manufacture of the garment. Embodiments of the invention are based on a simulated regulating effect for the garment, rather than simply on the measurement of the subject alone, resulting in a better fitting and more efficiently manufactured garment.

The measurement data may comprise a size, shape, or volume or the like of the body region, and may comprise imaging data representing the body region. The modification of the measurement data may adjust or modulate the data; the action of the garment simulated may be regulation, modulation, adjustment, control or compression of the body region. The regulating effect may not be produced by the garment itself; for example the regulating effect may be produced by a prosthesis inserted into the garment.

Suitably, the step of obtaining comprises obtaining measurement data for an unregulated state of the body region of the wearer, and the step of modifying comprises modifying the measurement data to simulate a regulated state of the body region of the wearer.

Embodiments of the invention are thus not reliant on measurements of a subject made when they are already wearing a garment, but are based on measurements of an unregulated state (for example, not wearing a garment or undergarment) which are then modified to simulate the regulated state. This allows for improved fitting accuracy.

Optionally, the regulating effect for the garment is for regulating a disposition of the body region, or a position or orientation of the body region, for example a position of the body region with respect to another part of or the remainder of the body or subject.

Suitably, the method comprises: modifying a portion of the measurement data representing a disposition of the body region, to alter said represented disposition by a determined extent; and using the modified measurement data to generate the fabrication data for manufacturing the garment to produce, when worn by the wearer, the regulating effect of altering the disposition of the body region by the determined extent.

In embodiments, the step of modifying the measurement data comprises processing the measurement data. The processing may be to transform, alter or change at least a portion of the measurement data.

Suitably, the regulating effect for the garment is for regulating a shape, or size, or volume of the body region.

Optionally, the step of modifying the measurement data to simulate the regulating effect comprises determining a model for a regulating effect of the garment on a body region. In embodiments, the step of modifying the measurement data to simulate the regulating effect comprises receiving a user input from a user interface.

In embodiments, the step of obtaining measurement data for the body region comprises electronically surveying a topography of the body region. Optionally, the step of electronically surveying comprises: capturing image data of the body region; and processing the image data using a photogrammetry technique to determine a topography of the body region.

These and other features of embodiments of the invention provide far more accurate measurement data, which can then be used to provide much greater fitting and manufacturing accuracy. In turn, the garment produced can be more accurately specified, which means that precise measurements can be used for elements of its fabrication, rather than using standard integer size elements.

Suitably, the step of modifying the measurement data comprises applying a transform to the determined topography of the body region. Optionally, the step of applying the transform comprises: comparing a property of the measurement data and/or a property of the garment to a database; and selecting from the database a transform element associated with the measurement data property and/or the garment property. In embodiments, the step of applying the transform comprises computing the transform from a plurality of transform elements.

In embodiments, the step of obtaining measurement data for the body region comprises using a sensor device to capture sensor data for the body region. The sensor may be an imaging sensor, or a radar or infra-red sensor, for example.

Suitably, the regulating effect for the garment is provided by one or more of: a structural element of the garment; a characteristic of the fabric of the garment; a padding element of the garment; and a prosthesis.

Optionally, the method comprises, following modifying the measurement data, displaying to the wearer the modified measurement data simulating the regulating effect for the garment. The (modified) measurement data can then be re-modified if necessary.

In embodiments, the body region is a bust region, and the garment is an underwear garment. Optionally, a structural element of the underwear garment is a support element, and the method comprises using the modified measurement data to generate the fabrication data, the fabrication data comprising a template for the support element. Suitably, the fabrication data comprises data for additive manufacturing of the support element.

Suitably, the method comprises: manufacturing an initial form of the garment using the fabrication data; using the measurement data to obtain a three-dimensional model for the body region; comparing the manufactured initial form of the garment to the three-dimensional model; and using the comparison to generate additional fabrication data for manufacture of the garment.

In embodiments, the method comprises: manufacturing an initial form of the garment using the fabrication data; using the modified measurement data to obtain a three-dimensional model for the body region; comparing the manufactured initial form of the garment to the three-dimensional model; and using the comparison to generate additional fabrication data for manufacture of the garment.

Optionally, the step of using the comparison comprises determining a dimensional difference between the manufactured initial form of the garment and the three-dimensional model, and using the dimensional difference to alter a corresponding dimensional parameter for the fabrication data. For example, a loose-fitting area of the garment may be determined to differ by a measured amount from the model, and this amount may be used to alter a parameter (such as a strap length) for the garment.

One embodiment of another aspect of the invention can provide a system for generating fabrication data for manufacture of a garment, said garment for regulation of a body region of a wearer of the garment, the system comprising: a measuring device for obtaining measurement data for the body region of the wearer; and a processor configured to: modify the measurement data to simulate a regulating effect for the garment; and use the modified measurement data to generate the fabrication data for manufacturing the garment.

One embodiment of another aspect of the invention can provide a method of manufacturing a garment for regulation of a body region of a wearer of the garment, comprising: obtaining fabrication data generated by a method according to any preceding claim; and using the fabrication data to manufacture the garment.

One embodiment of another aspect of the invention can provide a method of manufacturing a garment, the method comprising: obtaining measurement data for a body region of a wearer of the garment; using the measurement data to generate fabrication data for manufacture of the garment; manufacturing an initial form of the garment using the fabrication data; using the measurement data to obtain a three-dimensional model for the body region; comparing the initial form of the garment to the three-dimensional model; and using the comparison to modify the initial form of the garment.

This allows a more efficient means of producing the garment, removing the need for any iterative changes to the garment to be tried or tested against or on the subject.

Optionally, the step of using the measurement data to obtain the three-dimensional model for the body region comprises fabricating the three-dimensional model from the measurement data. Suitably, the step of using the measurement data to obtain the three-dimensional model for the body region comprises modifying a portion of a three-dimensional base structure to match a portion of the measurement data.

In embodiments, the step of comparing comprises applying the initial form of the garment to the three-dimensional model. Optionally, the garment is for regulation of the body region of the wearer, and the obtained measurement data is for an unregulated state of the body region of the wearer, wherein the method comprises modifying the measurement data to simulate a regulated state of the body region of the wearer, and wherein the step of comparing comprises applying the initial form of the garment to the three-dimensional model to simulate on the three-dimensional model a regulated state of the body.

One embodiment of another aspect of the invention can provide a method of manufacturing a garment, which garment having a regulatory element, the method comprising: obtaining measurement data for a body region of a wearer of the garment; using the measurement data to generate fabrication data for manufacture of the garment, wherein the fabrication data comprises a template for the regulatory element of the garment; and using the template to manufacture the regulatory element of the garment using additive manufacturing.

This provides a further means of increasing the speed and efficiency of the manufacture of the garment, and also allows for bespoke fabrication of the regulatory element itself, rather than its selection from a set of standard sizes. This can be particularly important in body regions in which small variations between areas of the body region, which would have been treated as equal or equivalent in previously considered methods, are present.

Optionally, the regulatory element of the garment comprises a support or structural element.

Suitably, the step of obtaining the measurement data comprises electronically surveying a topography of the body region.

One embodiment of another aspect of the invention can provide a method of generating fabrication data for manufacture of a garment, said garment for regulation of a body region of a wearer of the garment, the method comprising: obtaining measurement data for the body region of the wearer by electronically surveying a topography of the body region; wherein the step of electronically surveying comprises: capturing image data of the body region; and processing the image data using a photogrammetry technique to determine a topography of the body region; and using the measurement data to generate the fabrication data for manufacturing the garment.

Step of the methods according to the above described aspects and embodiments may be undertaken in any order.

Further aspects of the invention comprise computer programs or computer program applications which, when loaded into or run on a computer, cause the computer to carry out methods according to the aspects described above.

The above aspects and embodiments may be combined to provide further aspects and embodiments of the invention.

Processor and/or controllers may comprise one or more computational processors, and/or control elements having one or more electronic processors. Uses of the term "processor" or "controller" herein should therefore be considered to refer either to a single processor, controller or control element, or to pluralities of the same; which pluralities may operate in concert to provide the functions described. Furthermore, individual and/or separate functions of the processor(s) or controller(s) may be hosted by or undertaken in different control units, processors or controllers.

To configure a processor or controller, a suitable set of instructions may be provided which, when executed, cause said control unit or computational device to implement the techniques specified herein. The set of instructions may suitably be embedded in said one or more electronic processors. Alternatively, the set of instructions may be provided as software to be executed on said computational device.

BRIEF DESCRIPTION OF THE DRAWINGS

The invention will now be described by way of example with reference to the accompanying drawings, in which.

DETAILED DESCRIPTION OF EMBODIMENTS

Embodiments of the invention provide methods and systems for improved accuracy in measurement of a subject or (intended) wearer of a garment, and for improved speed and efficiency of manufacture of such garments. In particular, embodiments of the invention are directed to garments which are able to control, shape or regulate a part or region of the subject's body (of the relevant gender). This shaping or regulation can for example be to support the body region in question, or to alter an appearance of the body region once clothed in the garment, for example to simulate a removed area of the region, or to improve a perceived aesthetic appearance of the region, or to improve a comfort level when wearing the garment. In particular, embodiments are directed to complex garments such as lingerie or underwear, and in particular to upper body garments with regulation or support for a bust or breasts of the wearer.

Figure 1:
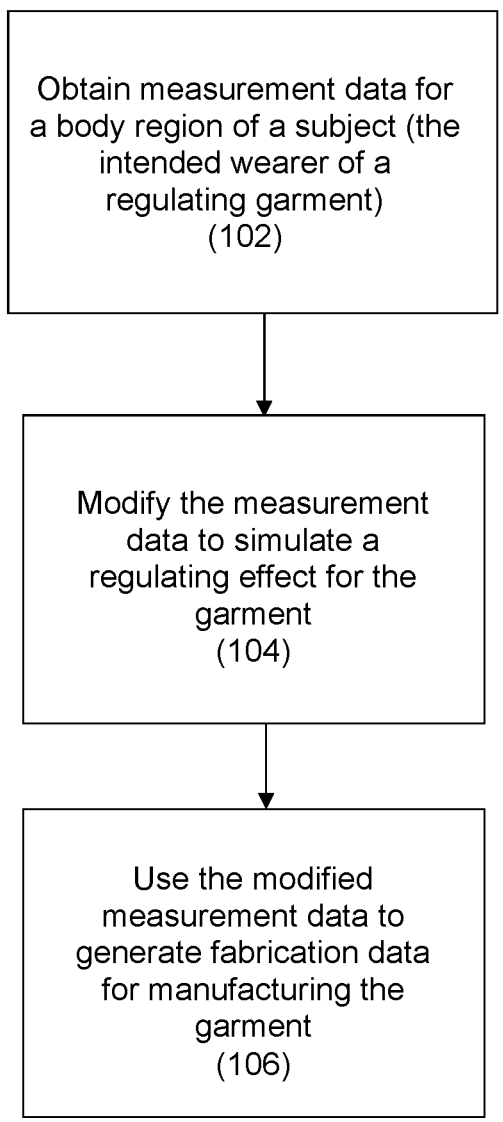
FIG. 1 is a diagram illustrating steps of a method according to an embodiment of the invention.

As shown in FIG. 1, a first step common to embodiments of the invention is to obtain (102) measurement data for a body region of a subject or intended wearer of a regulating garment. The measurement data may be any data which allows the generation of fabrication data for appropriate later manufacture of the garment. This is generally an improvement on traditional bespoke methods of manufacture, as the measurement can be highly precise if gathered electronically or digitally, using a sufficiently accurate protocol. In embodiments, imaging data or depth-of-field (radar or the like) data may be used. Embodiments of the invention capture a topographical survey of the body region, rather than (as traditionally) using a simple set of one-dimensional or linear measurements, such as tape measurements around the body region. This allows for a far greater number of data points which affords greater accuracy, and also allows for more efficient manipulation of the data, as described below. Embodiments of the invention can thus account for and manipulate various dimensions and facets of body region in question, rather than merely two linear measurements. For example, two-dimensional surface contours, volume, gradient and the like may be considered.

The body region in question may be any region which may be regulated (altered, controlled, shaped or the like) by a garment worn by the subject. For example, upper body underwear may support and regulate the bust of a female subject; other garments may regulate the shape of the seat or abdomen of the wearer, for example.

The regulation itself by the garment may be by structural means of the garment, for example by boning or underwiring in underwear. The regulation may be by padding or filling using any of the known materials, for example to fill an otherwise missing area of the body region, such as a portion removed in surgery. The regulation may be by a property or characteristic of the material itself, for example by flexibility or tensile strength of the material, which may moderate shape or movement of the body region, such as in sports undergarments. The regulation or shaping may also be produced by a prosthesis, such as a prosthetic body part or prosthetic to simulate a removed region, such as might be used by a subject having undergone a mastectomy. The garment itself may be any type for which a regulatory or regulating effect is applicable, such as an undergarment, swimwear, or a support garment or the like.

Previously considered methods for automated measurement of a body region of a subject typically are undertaken while the subject is wearing a garment, usually the type of garment for which they are being measured. This means that the measurement taken does not give an accurate measurement of the unsupported or unregulated position or orientation of the body region (for example, an unsupported breast). This usually results in unsatisfactory final garments.

On the other hand, methods for scanning body regions without any garments being worn are known, for other purposes such as medical procedures or cosmetic surgery. The measurement data from these processes can be arranged or modified in the manner known in those fields. However, these methods do not take account of a garment being worn and the behaviour of the body region in question when supported or regulated by such a garment. This means these methods are not useful for garment manufacture.

Embodiments of the invention therefore take the measurement data obtained (102) for the body region of the subject (the body region to be regulated by the garment), and then modify (104) the measurement data to simulate a regulating effect for the garment to be worn. Therefore these embodiments take the real or unsupported dimensions and topography of the body region in order to obtain the highest possible accuracy of measurement and the best quality of source data for manufacture, and then modify it artificially to produce the effect that would be produced on wearing a given supporting or regulating garment. The process of modification of the data thus changes, alters or transforms the measurement data into a modified state, for example a modified topography of the body region. This modified measurement data can then be used to generate (106) fabrication data for manufacturing the garment.

The modification to simulate the regulating effect can be applied manually by a user, or automatically using a simulated regulating effect of a garment, as described below, or by a combination of these.

The measurement data modified in this way allows the regulating effect of the garment in question to be considered, and gives a far more accurate fabrication template for producing the final garment. In addition, it allows for a truly bespoke garment to be manufactured, as the data is sufficiently detailed to allow the garment to be made precisely to the (modified) measurements, rather than choosing from standard size components, as is common even in bespoke manufacture of such garments. For example, rather than choosing from a set of integer cup sizes or under-wiring sizes or arrangements, a cup and under-wiring sized and shaped specifically to match the modified measurements can be used.

In addition, the accuracy of the measurement in embodiments can also account for differences in areas of the body region, for example in size, volume or shape differences between breasts; in previous methods these may simply be considered as being the same size and/or shape, especially since measurements of a bust are usually made of the entire bust and not per breast.

Moreover, using a precise measurement method and then modifying the data can be used for more distinct differences in size and shape in areas of a body region, for example where part of the region has had to be removed, for instance in a surgical procedure such as a mastectomy procedure. The measurement data in this case can be manipulated to simulate a garment reproducing the size and shape of one breast at the other breast where material has been removed, whilst for example padding sufficiently to provide comfort and support. Similarly, the precision of this measurement method can give more realistic modification representations, particularly in cases where the modification may be significant, such as for significantly different or unusual sizes, volumes or shapes for the body region, for garments for transgender subjects, or for during- or post-pregnancy changes in a bust region.

In turn, the more accurate representation (from the modified measurement data) can produce more accurate fabrication data for the garment. In the example of a garment for regulating the bust, the fabrication data can be much more precise, and can account for every minor variation in size and shape across the contour and volume of the bust, for example to account accurately for differences in size, shape or volume between breasts. For example, different sizes of fabric components, different sizes, lengths or thicknesses of support elements such as boning or under-wiring, different padding or prostheses, and even different fabric types can be specified per breast. Elements such as certain fabrics, components and particularly support elements can be made using additive manufacturing rather than choosing from a set of standard integer sizes, because the measurements are sufficiently accurate and attuned to differences in contour across the body region.

This measurement and then modification process producing a more realistic result for manufacture of an improved garment, can be of use of course in providing an improved means of manufacturing the garment itself; if the measurement is more accurate, and the modification is a more accurate portrayal of the way the garment will actually behave in the supported or regulated arrangement given the more accurate measurement input, the garment can be more precisely manufactured in the first iteration, can likely save iterations, and can produce a better fitting garment.

However in addition, the wearer can also be shown the results of the modification in order to approve the appearance of the modification simulating the regulated state of the body region. For example, a wearer might wish their bust to be more robustly supported than might be assumed by a standard support amount assumed by the modification process (and displayed to the wearer as simulated).

The fabrication data generated from the measurement data and then used for manufacture can be, for example, a pattern for fabric to be cut, a precise (non-integer or non-standard) size or dimension of padding to be used, a precise (non-integer) dimension for a structural element such as boning or under-wiring, or the like.

In further contrast to previous methods of medical or cosmetic scanning of body regions, embodiments of the invention can make more sophisticated use of similar data. For example, a measurement data set which might otherwise bear similarity to that from a medical scanner can be customised before or during the modification step. Different data points may be used; for example some data points may be disregarded in areas which are not useful for generating fabrication data, or fewer data points overall may be used in any case, so that the data is easier to manipulate. This may be particularly important when the modification step is simulating a suite of complex additive and regulating materials and effects produced by different components and materials of the garment.

Figure 2:
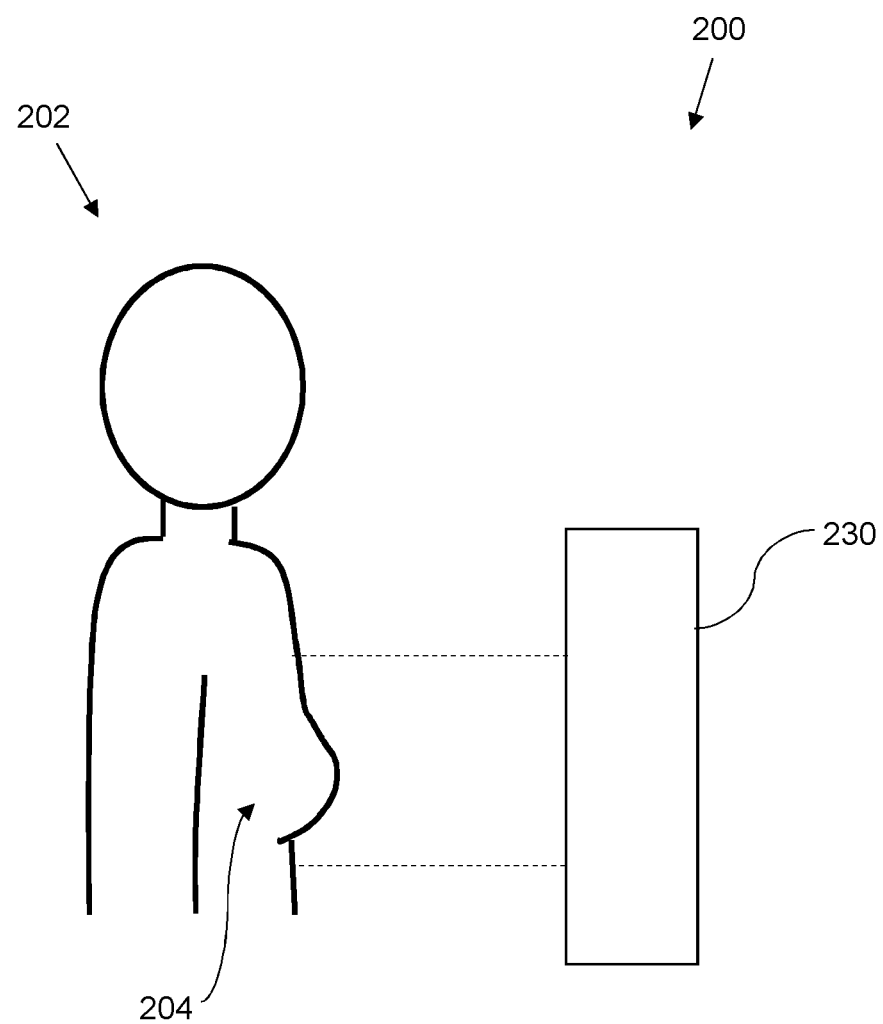
FIG. 2 is a schematic diagram illustrating measurement of a subject according to an embodiment of the invention.

FIG. 2 is a diagram illustrating a system (200) for obtaining measurement data for a subject (202), according to an embodiment of the invention. In this embodiment, the body region to be measured is a chest region (204) of a female subject (202). The relevant regulating garment in this example is a brassiere. The subject is not wearing any garment or underclothing during the scan, so that the measurement can be made of the body region in the unsupported or unregulated state. A measurement device 230 is positioned in front of the subject, so that the device can measure the body region. The device in this embodiment is capturing a survey or imagery of the body region, which can then be used for modification to generate fabrication data for manufacturing the garment.

In this embodiment, the device 230 is an imaging device, capturing image data, which image data can be processed using, for example, photogrammetry techniques to determine depth of field and thus determine relative depths within the field of the elements and contours of the body region being surveyed. The image data and/or depth of field data can of course be used to determine or infer (information on) other features of the body region, such as volume of an individual breast, relative distances between features of the region such as the sternal notch and the nipple centre, and the like.

The method used for determining depth of field (and thus topography) from image data may be any of a number of previously considered methods. For example, a photogrammetry technique may project a pattern (such as a speckle pattern) from the imaging device (or a component of an imaging system) onto the surface of the subject, and process the captured images to recognise the pattern (and its relative distortion or modulation by the topography of the surface), in order to generate from the image data the topography of the surface.

In embodiments of the invention, the photogrammetry technique instead uses a plurality of imaging devices (at least two), in order to provide triangulation of the points in the image data. Since there are at least two different devices in different locations directed towards the subject from different angles, theoretical projection or ray-tracing of lines of sight from the two devices will necessarily intersect, and these can be used to triangulate the image data points and generate the topography.

In these embodiments, a Bézier surface method is used to determine the size, shape and volume of the subject body region; as in known methods, this method constructs a surface from a series of landmark data points on the surface, and the known locations of those landmarks in the three-dimensional space captured (in this embodiment, these are determined from the photogrammetric processing of the image data).

In other embodiments, the system can use other imaging or sensor systems to capture the topographical data, such as radar or infra-red sensor systems or the like. The sensor system may be housed in a fixed apparatus as in embodiments described above, or may be in a mobile, portable or hand-held sensor or scanning device. In alternative embodiments, the measurement data captured can include data relating to tissues within or inside the body region, for example in instances where two different tissue types within the body region may behave differently, and/or in co-operation, under the regulatory effect from the garment. In such embodiments, a transmissive imaging protocol may instead or in addition be used, such as a magnetic resonance imaging or computed tomography protocol.

In FIG. 2 the device is generally indicated as being disposed in front of the subject. In embodiments, the capture device may be disposed either side of the subject instead of or in addition to being in front of the subject. Full three-dimensional scanning devices may also be used. If required a subject may be scanned from front and back separately, and indeed separate areas of the subject (such as upper and lower halves of the body or abdomen) can be scanned separately.

In one embodiment, in a scanning process the subject is scanned with their hands positioned straight out parallel with the ground; this may provide an optimal neutral position for the bust, for the unregulated state to be measured. In embodiments, a subject is scanned twice, once front facing the scanner(s), and once with their back to the scanner(s). The scanner and associated processing of the image data create an avatar of the subject, which can then be used to aid visualisation of modification or manipulation of the measurement data.

In embodiments, landmarks can be determined from or overlaid on the image data captured from the subject. In one embodiment, the landmarks can be derived from the image data, for example by known methods of segmenting the image data and establishing landmark points at vertices between segments. For instance, an image region segmented into background, arm and chest segments can establish one or more landmarks between the arm and chest.

In another embodiment, the landmarks can be overlaid on the image data. For instance, a user may manually overlay a standard landmark set onto the image data, and adjust the landmarks to the image data of the subject in question, for example moving landmarks of a set onto given areas of the body, for instance moving an arm/chest landmark to that part of the image.

Once the landmarks have been established on the image data, measurements can be taken between the landmarks to give details for or define the initial state of the subject to be modified.

The subject image data can then be manipulated to determine the modification required by or for the regulating garment. For example, the data can be modified to indicate a simulated or expected change in the shape or disposition of the body region given a regulating effect from a given garment. In a simple example, the regulating garment may move the bust so that a nipple is 22.5 cm from the sternal notch. The image data can therefore be modified to simulate this effect, and to display the result to the user. The result can be reviewed by the user and, if approved, marked completed, or if not a further modification can be made, for review and/or display.

In embodiments, the shape of the body region can be altered manually by a user interacting with an interface coupled to a display device; the user can specify or manually (using e.g. a mouse or the like) alter distances between landmarks or shapes of given regions on the avatar generated from their measurement data. This is an example of a manually or user-adjusted simulation of the regulatory effect; if the user modifies the shape of the region or landmark to a required degree in order for example to determine that this is the effect that the garment should have, this should result in the regulatory effect of the resulting garment applying that change in shape to the subject when the garment is worn.

Once the modification is complete, the landmark data or measurements taken from the modified image data are used for the fabrication data for the garment.

Figure 3:
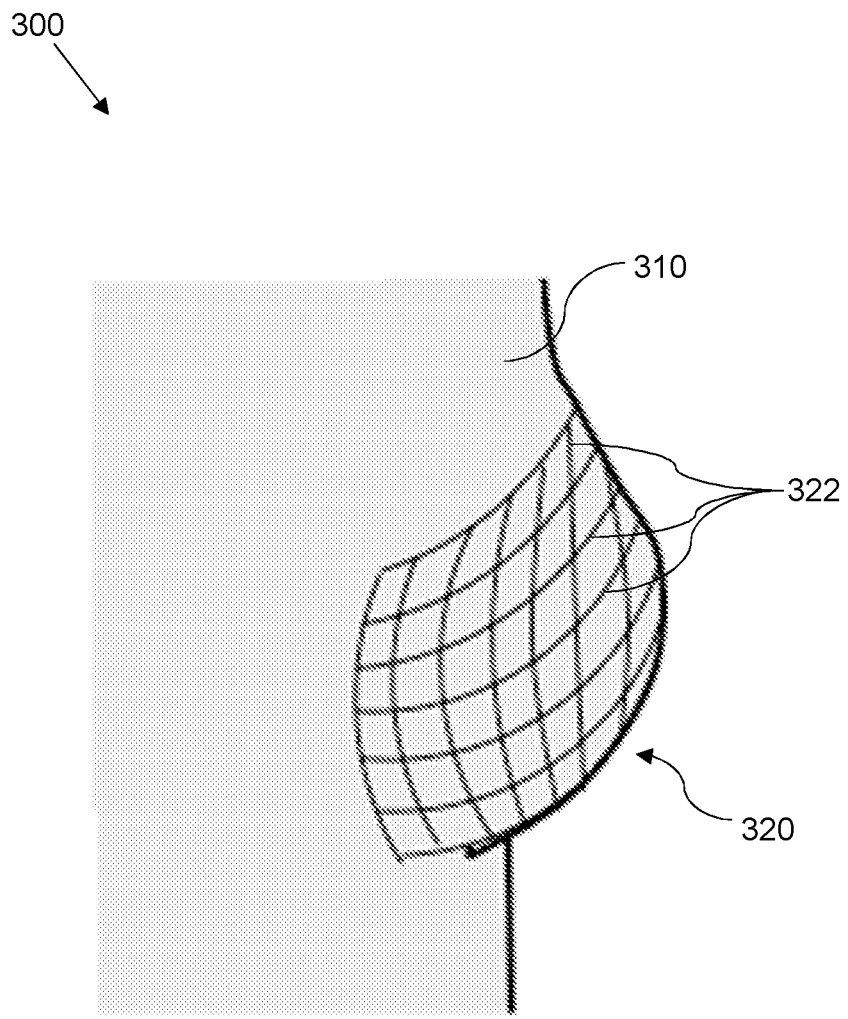
FIG. 3 is a diagram illustrating a topographical over-lay for a body region of the subject of FIG. 2, according to an embodiment of the invention.

FIG. 3 is a diagram illustrating figuratively a topographical overlay (300) for the body region (310) illustrated being captured in FIG. 2. This diagram illustrates a side-on view of the chest region for the subject, therefore illustrating a single breast from a side position (320). A grid (322) of topographical or contour lines is overlaid on the breast, to illustrate the data capturable of this body region. In this example, the capture device may capture imaging or depth of field data from a set of discrete points all over the body region, and then a mesh or grid of landmark points can be constructed from these data points. The topographical overlay 322 shown intersects a set of these data points. In embodiments the data points may be distributed at a distance of 10-20 mm or so from each other as illustrated here, but in other embodiments may be more or less detailed (or at higher or lower resolution). In this embodiment, the data from the rest of the body region has been discarded, and only those data points returned as having particular topographical features are retained; here the data points including the breast, rather than upper chest and lower abdomen of the subject. The topographical overlay in FIG. 3 is illustrative of the capture method, but an overlay like this can also be displayed to a technician or wearer during the measurement and modification process.

Figure 4:
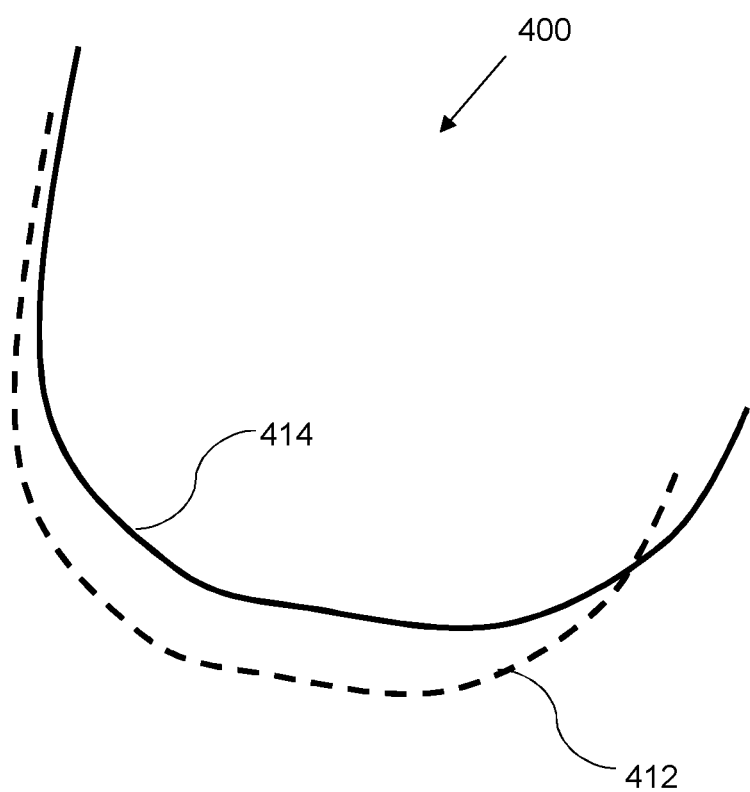
FIG. 4 is a diagram illustrating regulated and non-regulated states for a body region according to an embodiment of the invention.
Figure 5:
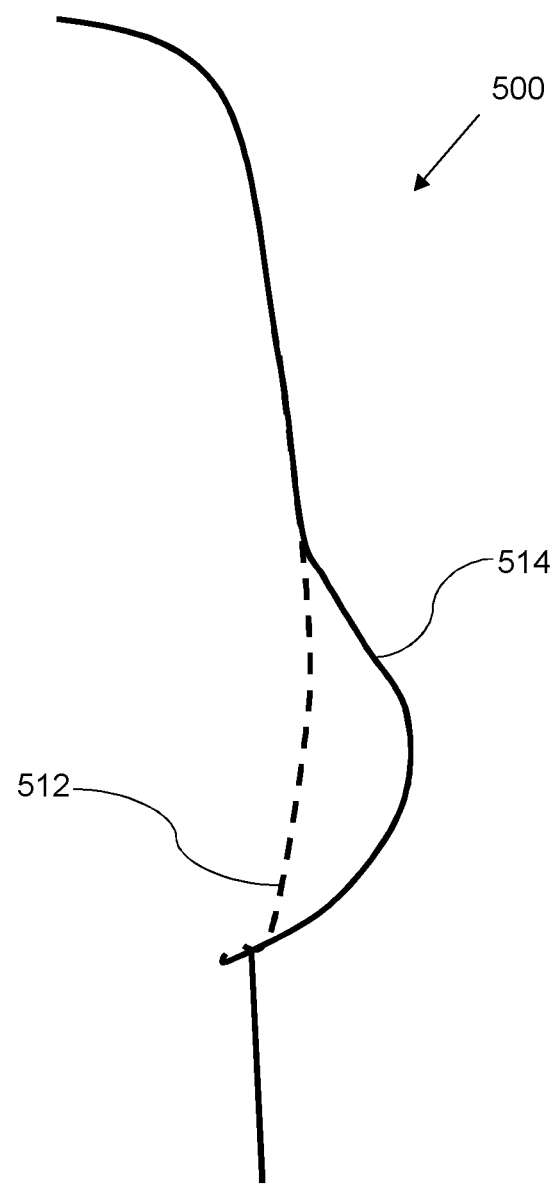
FIG. 5 is a further diagram illustrating regulated and non-regulated states for a body region according to an embodiment of the invention.

FIGS. 4 and 5 are diagrams illustrating regulated and non-regulated states for a body region according to an embodiment of the invention. In FIG. 4, the body region (400) illustrated is again a single breast, here in a front-on view. For illustrative purposes in this Figure a single line is used to illustrate the movement of the body region from regulated to unregulated states; in practice, the entire region may of course move, and each data point captured (rather than along the single line) from the topographical survey of the region may move in the regulated position or state.

The line 412 indicates the position of the breast in an unregulated unsupported and downwardly oriented position under gravity and state captured in the initial unsupported breast measurement data captured by the device. The initial measurement data is then modified or manipulated to simulate the position of a regulated state (414) for the region when the regulating garment is being worn, thereby to form modified upwardly displaced supported breast measurement data. In this case, the simulation is of the breast in a supported position, once the brassiere is being worn, that is when the brassiere has the effect of displacing the breast upwardly from the unregulated unsupported and downward oriented position under gravity, to a relatively upward disposition in the regulated state. The modification of the data takes the data points from the initial measurement, and maps or transforms these data points to the new relatively upwardly displaced position using a simulation for how the data points will behave. The simulation can in a simple form merely use a simple transform or projection, for example to move the breast entirely (without substantially altering a topography of the region) from the unsupported position to a regulated position by a predetermined amount or distance. This embodiment (and others described below) may use a standard formula for a post-transform position of the body region. For example in the case of a brassiere for a bust region, the measurement data representing the unregulated state of the breasts may be transformed to produce a predetermined optimum relatively upwardly displaced position for the breasts on the chest of the wearer when wearing the garment. For instance, the position on the chest may be determined using a lowest extent for the bust of one-third of the distance between the bottom of the shoulder and the bottom of the elbow of the wearer.

In more sophisticated arrangements, the modification can use a three-dimensional transform which will translate all data points according to pre-determined models for movement of the body region. These can be pre-determined for example by using image capture repeatedly on a body region being moved through a set of measurement positions; for example, movement of a lower portion of a breast will result in a certain movement of an upper portion of the breast, or an upward movement of the base of the bust will result in a given compression of the bust region as a whole, or a given reshaping of the volume of the bust or breast.

In embodiments of the invention, a database is created and maintained of a series of measurements of body regions of subjects with and without a variety of regulating garments (of different sizes, shapes, material specifications, support elements and the like) being applied to the body region. The database can also store portions of the body regions, so that portions of body regions can be combined for a single simulation. In an embodiment, given a set of measurement data captured from the user, and a given garment to be applied, an associated predicted transform or movement for that given combination can be looked up in the database by determining a closest match to the current measurement data (and proposed garment), to provide the simulation of the regulating effect for that user. In embodiments, individual elements of the regulating effect of garments can be stored in the database, so that these can be combined for a particular subject or effect. For example, for a given measurement of a subject, the effect of a support element and a given garment type can be combined to give the simulated effect.

In other similar embodiments, the transformation can be programmed using garments on a variety of body regions and capturing the results. The results will provide a set of transforms expected when using that garment to move the body region in given directions, rather than merely movement of the region itself. In addition, combination of component features can be combined to produce the transformation algorithm. For example, a combined transformation model can incorporate the model for each of several components of a garment modelled (for a brassiere, underwiring, padding and fabric behaviour) and for a base movement model. Another complex model may incorporate features taking account of the initial measurement data; for example a larger body region may have a different standard movement transformation model from that of a smaller body region.

In embodiments, calculation of the transformation can include modelling of the compression characteristics and other tissue behaviour of the relevant body region. For example, an inward movement of the side of one breast by an amount can be used as an input to a model which will consider whether this will produce compression of only the immediate area, or movement of the entire body region, and the consequential behaviour of the neighbouring regions, such as an expansion of an upper portion of a breast if a lower portion is compressed.

It may be noted that in embodiments such as those described above the simulated regulating effect for the garment, applied to modify the initial measurement data, can of course be derived solely from modelling the effect of the garment on the (or any given set of) measurement data, without any user or manual input to adjust or modify the measurement data.

The modification can also be altered for certain circumstances which may arise in particular subjects. For example a standard transformation algorithm may be amended to account for one part of the body region being substantially different from another; for example if one breast of a bust region has been partially removed, the asymmetry may be pre-programmed in to the transformation model, or may be programmed to predict the behaviour of a prosthesis under regulation by the garment, rather than of the behaviour of breast tissue.

The modification or transformation can also as appropriate produce a simulation for the effect of whichever regulating effect (or combination of effects) is employed by the garment in question, such as under-wiring, filling, material characteristics, prosthesis and the like. A regulating effect produced by material characteristics may of course be different from that produced by under-wiring. In another example, in modelling a transformation for a regulating effect of a brassiere, the regulating effect may be simulated by one or more of the methods described above, but may also be moderated for one breast which requires a prosthesis, as the prosthesis will not behave in the same way as the other breast when, for instance, a compression effect is applied.

In embodiments, measurement data from transmissive imaging protocols such as MRI or CT may be used; here the data points will be drawn from within as well as on the surface of the body region. In these embodiments, the transformation step can incorporate both sets of data.

In other embodiments, the measurement data may be segmented before the manipulation or transformation step, and manipulated differently by segment. For example a segmentation may determine an upper and a lower region of a breast, for example above and below the nipple, or estimate a region disposed in front of the chest muscle of the wearer, and a region below the chest muscle (since these regions may be able to be ascribed different movement models). In the latter case, the chest muscle may be identifiable from a transmissive imaging protocol.

FIG. 5 illustrates a side-on view similar to that shown in FIG. 2. The body region (500) is again a breast of a female subject, and in this case the breast has been partially removed surgically. The initial measurement data is shown by the line 512. The regulated state is shown by the line 514; this modification of the initial measurement data (512) has incorporated use of a prosthesis, such as a filler or pad, to be disposed between the breast and the garment, and then modelled the movement of the breast region once the garment has been applied to the entire bust.

As noted above, the measurement data may in such cases be manipulated either to assume that the subject will be using a prosthesis, or to simulate the effect of a prosthetic incorporated into the garment itself.

In a further illustrative embodiment, the body region to be regulated is an abdomen region of the subject. In such an example, the abdomen of the subject can be measured in the same way, using the imaging techniques outlined, to give an unregulated state for the abdomen region. The measurement data can then be manipulated to simulate the use of a regulating garment on the abdomen region. For example, the user may wish to see a representation of a garment which may partially compress tissues of the abdomen.

The measurement data will be transformed using a model of the properties ascribed to the garment, and the modified measurement data can then be used to determine a simulated regulated state which can then be assessed. In the case of an abdomen region garment, the properties may be compression properties.

In embodiments of the invention, a regulated state (e.g. of the abdomen) may then be determined by the clinician, or by the subject viewing a display of the simulated regulated state, to be insufficient, or excessive; an alternative regulating effect can then be selected. This may be selection of a different garment having different properties, a different fabric having different (e.g. compression) properties, or a differently structured garment (such as one with or without support structure elements). In some circumstances, the system itself may determine that a different regulating effect is required; for example, a certain regulating effect can raise an alert message, for example if the simulated effect produces too great an effect. A suitable threshold can be applied to the simulated transformed representation data to achieve this.

Once the new regulating effect has been selected, the new simulated regulated state can be assessed.

As noted above, once the modification of the measurement data has been made, this modified data can be used to generate the fabrication data for manufacture of the garment. For example, the dimensions of a bust modified to simulate wearing a garment can be used directly as the dimensions of the components for that garment, as the garment to those dimensions has now been simulated to provide the correct sizing, shaping, support and regulation of the bust. The direct use of the data may be, for example, a data set from the modified data to provide a length of a brassiere strap, or a size of a cup, or an area and shape pattern for a fabric panel for use in part of the brassiere, or a precise length of an under-wire or boning component. For example, a dimension from the modified data of a vertical distance will determine or indicate a strap length, and so forth.

Methods and systems of embodiments of the invention have the advantage that precise measurements can now be used for all these components of the garment, rather than using standard integer cup and under-wiring sizes, for example. This is in part due to the capture of more accurate measurement data, and effective simulation of the regulating effect on those measurements. For example, whereas in previous methods a simple set of a few linear measurements would provide either a selection of the most appropriate standard garment, or at best provide bespoke manufacture from those few measurements using standard components, in embodiments since essentially the entire topography of the modified or simulated regulated region is available, any size, shape, strength or similar factor for a component of the garment can be determined precisely.

Figure 6:
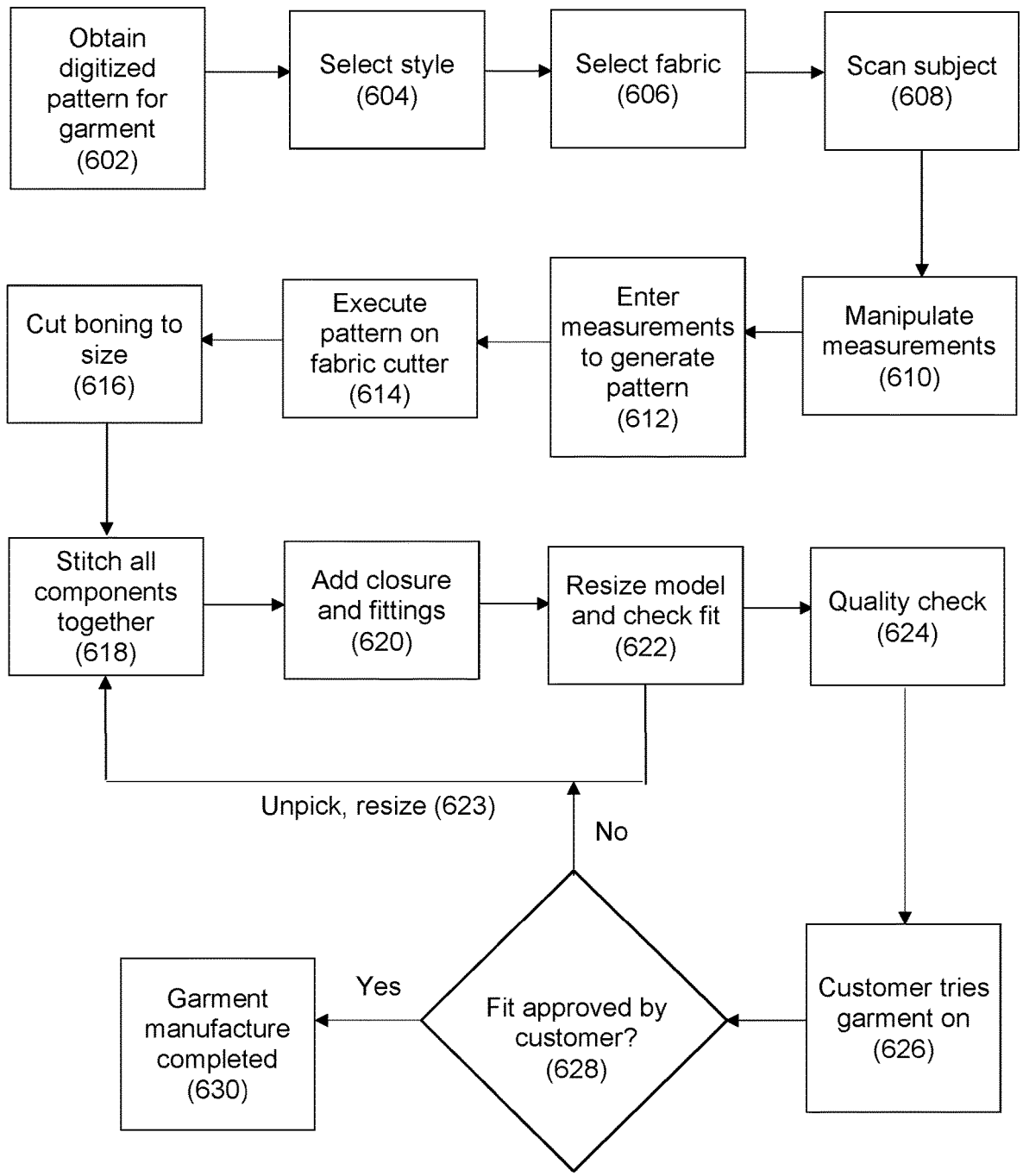
FIG. 6 is a diagram illustrating steps of a method according to an embodiment of the invention.

FIG. 6 is a diagram illustrating steps of a method of manufacture according to an embodiment of the invention, which in this example is for manufacture of a brassiere. First, the digitized pattern for the garment is obtained (602). This digitized pattern contains all the possible variables for the garment which are available to be selected or modified by the input of the measurement data, such as fabric measurements, cup sizing, and the like. A style (604) and fabric (606) are selected. The subject is then scanned as described above (608) and the measurement data is manipulated (610) to simulate the garment regulation. At this stage the subject can be shown on a display a representation of the body region wearing the regulating garment. If necessary, the modification data can be further modified at this stage. For example if the subject would prefer a position of the bust to be higher, the corresponding further modification of the measurement data can be made, and then further displayed for confirmation by the subject.

The finalised manipulated data is then used with the obtained generic digitized garment pattern to generate (612) the bespoke pattern(s) for this garment for this subject. The bespoke pattern can then be used for the fabric cutter (614), and boning cut to size (616). The various components of the brassiere are then stitched together (618), and appropriate closures and fittings added (620).

The pattern cutting stage can be operated by an automated cutting arrangement, such as those previously considered for other applications, but not previously considered for bespoke garment manufacture in the manner described herein. For instance a cutting device (such as a textile laser cutting machine) can be programmed with the pattern for the garment, and in embodiments of the invention the pattern modified using the fabrication data, so that the fabric is cut to the bespoke pattern for the subject. This enables a further increase in speed of the garment manufacturing process; the cutting stage can for example be reduced to seconds, and the stage assembling the components to around half an hour. Improvements using the embodiments described herein can result in such an efficient end-to-end system from automated measurement, modification, manufacture, model testing and finalisation that the entire process may be completed within a few hours.

In the pattern cutting and boning cutting stages, some or all of these may be replaced by additive manufacturing techniques. For example, instead of boning being cut to precise size (in contrast to previous standard sizes or lengths), the support element may be 3D-printed to precise dimensions determined from the modified measurement data. In an embodiment, the measurement data modification stage can incorporate a model for varying the transform of the unregulated measurement data to the regulated state by a support element model using more than one dimension, i.e. a two or three-dimensional support element rather than a largely one-dimensional (wire) element.

At this initial stage (620) in a traditional manufacturing procedure, the initial garment would then be checked by being worn by the subject, possibly in repeated iterative fittings. In embodiments of the invention, this stage can be replaced or simplified by using a dummy or three-dimensional model or mannequin which can be modified to the shape of the subject. This is in part enabled by having not only the measurements of the subject in an unregulated state of the body region, but also the modified, regulated state for the region; the model or mannequin can be modified to these precise measurements to simulate the subject trying on the garment. An example of such a modifiable mannequin is the iDummy made by Winswin Ltd; this comprises a set of moveable panels which can be directed relative to each other, to simulate a wide variety of different sizes of body regions. Such a modifiable model system can be programmed with the precise modified measurement data for the subject, for example to replicate uneven breast sizes, or a prosthesis (or to accommodate the prosthesis if it is incorporated into the garment). A seamster/seamstress can then perform a fitting of the garment on the model as if it were the subject.

In an alternative, the dummy/model's initial arrangement may be set to reflect the unregulated or unmodified measurement data of the subject, and once the garment is applied, the model can be used to check the regulating effect on the model against the simulated modified measurement data, and in that manner check (620) the size and fit of the garment.

When the check (622) has been made, it may still be necessary to modify the garment; if necessary, the garment or components of it are unpicked and resized (623), and then the components are re-stitched and this section of the process repeated. Once the fit is satisfactory, a final quality check (624) of the garment is undertaken, typically to ensure that the stitching and other detailed fabrication properties of the garment are satisfactory. The customer is then invited to try on the garment (626) to give their approval (628). If the fit is not approved, the unpick, resize and re-stitch section of the process is repeated. If the fit is approved, the manufacture process is complete (630).

It should be noted that the above is an example only of a method of manufacture according to embodiments of the invention; many of these steps may not be required in other embodiments. For example, a style and fabric (604, 606) may not be optional for a particular garment. Certain garments may not require boning (616) or support or underwiring features. Certain garments may require more than one closure (620), or may require no closure at all, such as a sports undergarment. Garments for other regions of the body besides the upper body will not require some of these features, such as boning, closures and fittings.

In embodiments, the scanning apparatus for scanning the subject (608) may be in a different physical location from the cutting and assembly apparatus; for example the former being in a retail setting, and the latter off-site. The scanning apparatus may be in the same location as, or incorporated into, other scanning environments, such as those used for screening. Indeed, screening technology could be incorporated in a scanner as described herein. In embodiments, the materials used for fabricating the garments can be substituted for other types of materials, such as smart materials or biosensory materials.

It may also be noted that throughout the procedure measurements made, modifications made, resulting fabrication data, records of garments produced and the like can be stored in a database. These stored data can be used for example with reference to a given subject, in order for example to repeat a similar fabrication for that subject, or to track measurements for that subject over time, or to produce a fabrication step without the subject being present, using previous measurements. The stored data can also be anonymised and used as a collected resource to refine aspects of the process.

Figure 7:
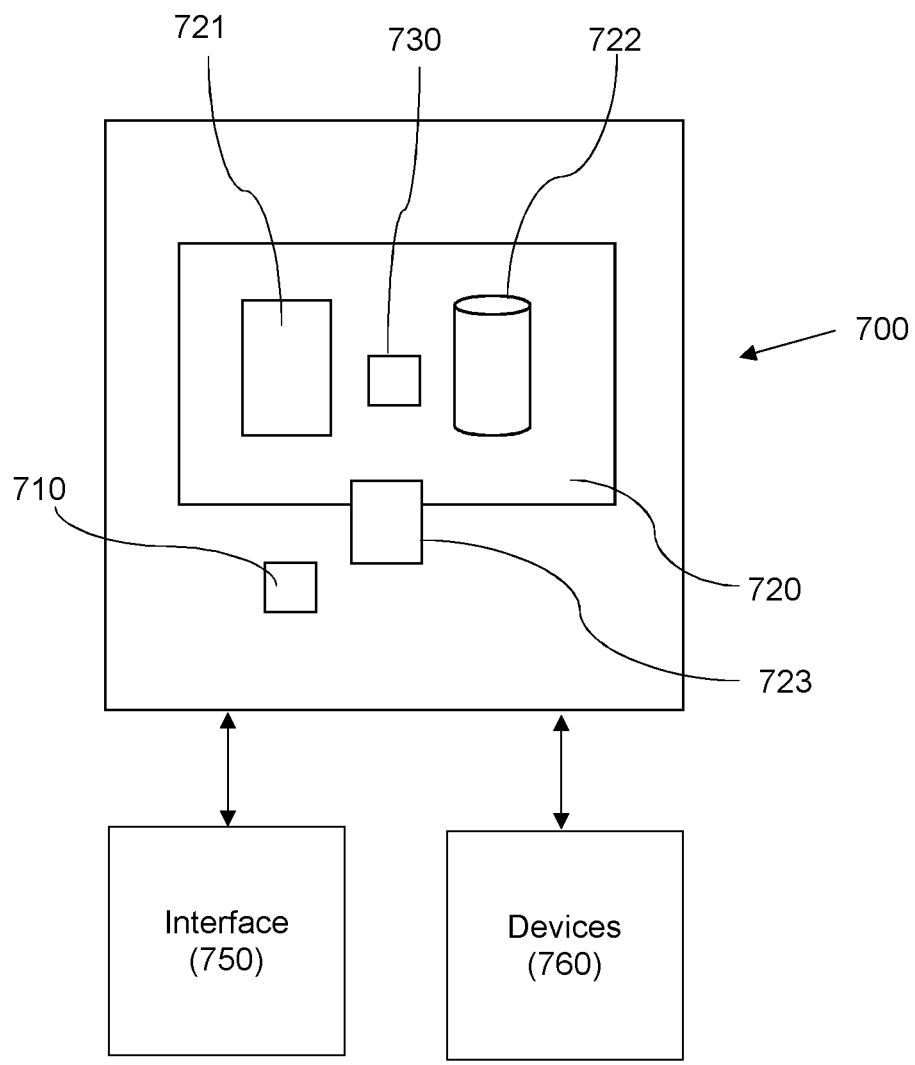
FIG. 7 is a diagram illustrating components of a computer system according to an embodiment of the invention.

FIG. 7 is a diagram illustrating the components, structure and functionality of a computer system (700) according to an embodiment of the invention which can provide features of methods and systems of embodiments of the invention described above.

The system 700 comprises a processing environment 720 with processor 721 and memory 722, with associated communications functionality 723. The communications functionality may include a networking capability allowing communication with a network or directly with another device, such as a capture device 230 as shown in FIG. 2. This communication may be secured. Alternatively, the capture device 230 may incorporate the computer systems described herein. The memory 722 may store readable instructions to instruct the processor to perform the functions of the system. The processor 721 is a representation of processing capability and may in practice be provided by several processors. A database 710 is provided, storing data as applicable. For the system described above this database can provide the storage for instructions for carrying out processes of embodiments of the invention. For example, these can be algorithms for modelling and transforming measurement data as described above.

Elements shown within the processing environment 720 use the processor 721 and the memory 722 to deliver functionality; for example, these elements can provide steps of embodiments of the invention such as obtaining measurement data for the body region of the wearer and modifying the measurement data to simulate a regulating effect for the garment.

A management system (730) module is located within the processing environment 720, to provide the management functions for the system. The management system may also comprise functions of other parts of the system 700, such as the processor 721, the memory 722 and the database 710.

The computing devices noted above with reference to FIG. 7 may include one or more of logic arrays, memories, analogue circuits, digital circuits, software, firmware and processors. The hardware and firmware components of the computing devices may include various specialized units, circuits, software and interfaces for providing the functionality and features described herein. The processor(s) may be or include one or more microprocessors, application specific integrated circuits (ASICs), programmable logic devices (PLDs) and programmable logic arrays (PLAs). The memory 722 may be or include RAM, ROM, DRAM, SRAM and MRAM, and may include firmware, such as static data or fixed instructions, BIOS, system functions, configuration data, and other routines used during the operation of the computing device and/or processor.

The memory 722 and/or the database 710 may also provide non-volatile, bulk or long term storage of data or instructions for the system. This may take the form of a disk, tape or other reasonably high capacity addressable or serial storage medium. Further storage devices may be external to the system, such as network storage or cloud-based storage.

The interface 750 can provide for example the technician or wearer using the capture device 230 with a means for choosing elements of the data to review, or for inputting data to modify the measurements. The interface may allow the processing environment to be connected to peripheral devices (760) such as displays, keyboards and USB devices. The devices 760 connected to the computer system may also include the capture device 230 of FIG. 2.

It will be appreciated by those skilled in the art that the invention has been described by way of example only, and that a variety of alternative approaches may be adopted without departing from the scope of the invention, as defined by the appended claims.

The invention claimed is:

1. A method of generating fabrication data for manufacture of a brassiere, said brassiere for support of at least one breast in a bust region of a wearer of the brassiere, the method comprising:
obtaining unsupported breast measurement data for the at least one breast in the bust region, with the least one breast in an unregulated, unsupported and downwardly oriented position under gravity;
setting an initial arrangement of a three-dimensional model for the at least one breast in the bust region to reflect the unsupported breast measurement data;
modifying the unsupported breast measurement data to simulate an upwardly displaced regulating effect of the brassiere to displace the at least one breast upwardly from the unregulated, unsupported and downwardly oriented position to a relatively upward position in an upwardly displacing regulated state by modifying the unsupported breast measurement data to simulate the relatively upward position in the upwardly displaced regulated state, to form modified upwardly displaced supported breast measurement data;
checking the upwardly displacing regulating effect on the three-dimensional model for the at least one breast in the bust region against the modified upwardly displaced supported breast measurement data; and
using the modified upwardly displaced supported breast measurement data to generate the fabrication data for manufacturing the brassiere.

2. A method according to claim 1, wherein the step of modifying further comprises: modifying a portion of the unsupported breast measurement data, to alter the represented unregulated, unsupported and downwardly oriented position under gravity by a determined extent to form the modified upwardly displaced breast measurement data; and
using the modified upwardly displaced breast measurement data to generate the fabrication data for manufacturing the brassiere to produce, when worn by the wearer, the upwardly displacing regulating effect of displacing the at least one breast upwardly from the downwardly oriented position to a relatively upward position in the upwardly displacing regulated state by the determined extent.

3. A method according to claim 2, wherein the step of modifying a portion of the unsupported breast measurement data comprises processing the unsupported breast measurement data to transform at least the portion of the unsupported breast measurement data.

4. A method according to claim 3, wherein the step of modifying a portion of the unsupported breast measurement data is configured for the upwardly displacing regulating effect to regulate a shape of the at least one breast in the upwardly displaced regulated state.

5. A method according to claim 3, wherein the step of modifying a portion of the unsupported breast measurement data to simulate the upwardly regulating effect comprises determining a model for the upwardly regulating effect of the brassiere on the at least one breast.

6. A method according to claim 5, wherein the step of modifying the unsupported breast measurement data comprises receiving a user input from a user interface.

7. A method according to claim 6, wherein the step of obtaining unsupported breast measurement data comprises electronically surveying a topography of the bust region.

8. A method according to claim 7, wherein the step of electronically surveying comprises: capturing image data of the bust region; and processing the image data using a photogrammetry technique to determine a topography of the bust region.

9. A method according to claim 8, wherein the step of processing includes using at least two images to provide triangulation of points in the image data, wherein the two images form intersecting projections or ray-tracing of lines of sight, for use to triangulate the image data points and generate the topography.

10. A method as defined in claim 9, wherein the step of processing includes constructing the topography from a series of landmark data points, including of at least one known nipple landmark on the at least one breast, and at least one other known landmark in the three-dimensional space from the photogrammetric processing of the image data.

11. A method as defined in claim 10, wherein the step of processing comprises taking measurements between the known landmarks to define the unregulated, unsupported and downwardly oriented position under gravity, and modifying the data to indicate the upwardly displaced regulated state, by a change in the relative position of the nipple landmark relative to the other known landmark.

12. A method as defined in claim 11, wherein the step of processing comprises configuring the other known landmark to be a sternal notch.

13. A method according to claim 8, wherein the step of modifying the unsupported breast measurement data comprises applying a transform to the determined topography of the bust region.

14. A method according to claim 13, wherein the step of applying the transform comprises: comparing a property of the unsupported breast measurement data and/or a property of the brassiere to a database; and selecting from the database a transform element associated with the unsupported breast measurement data property and/or the brassiere property.

15. A method according to claim 14, wherein the step of applying the transform comprises computing the transform from a plurality of transform elements.

16. A method according to claim 15, wherein the step of obtaining measurement data for the bust region comprises using a sensor device to capture sensor data for the bust region.

17. A method according to claim 16, wherein the upwardly regulating effect for the brassiere is provided by one or more of: a structural element of the brassiere; a characteristic of the fabric of the brassiere; a padding element of the brassiere; and a prosthesis.

18. A method according to claim 16, wherein the method comprises, following the step of modifying the unsupported breast measurement data, displaying to the wearer the modified upwardly displaced supported breast measurement data simulating the regulating effect for the brassiere.

19. A method according to claim 18, wherein a structural element of the brassiere is a support element,
and wherein the method comprises using the modified upwardly displaced supported breast measurement data to generate the fabrication data, the fabrication data comprising a template for the support element.

20. A method according to claim 16, wherein the fabrication data comprises data for additive manufacturing of the support element.

21. A method according to claim 16, further comprising:
manufacturing an initial form of the brassiere using the fabrication data;
using the unsupported breast measurement data to obtain the three-dimensional model;
comparing the manufactured initial form of the brassiere to the three-dimensional model to form a comparison; and
using the comparison to generate additional fabrication data for manufacture of the brassiere.

22. A method according to claim 21, wherein the step of using the comparison comprises determining a dimensional difference between the manufactured initial form of the brassiere and the three-dimensional model, and using the dimensional difference to alter a corresponding dimensional parameter for the fabrication data.

23. A method of making a brassieres according to claim 22, comprising the steps of:
accessing the additional fabrication data; and
fabricating the brassiere according to the additional fabrication data.

24. A brassiere for regulation of a bust region of a wearer of the brassiere, manufactured by a method according to claim 23.

* * * * *